United States Patent
Yasuda et al.

(10) Patent No.: US 11,193,509 B2
(45) Date of Patent: Dec. 7, 2021

(54) FLUID CONTROL VALVE AND FLUID CONTROL DEVICE

(71) Applicant: HORIBA STEC, Co., Ltd., Kyoto (JP)

(72) Inventors: Tadahiro Yasuda, Irvine, CA (US); John Dick, Irvine, CA (US)

(73) Assignee: HORIBA STEC, Co., Ltd., Kyoto (JP)

( * ) Notice: Subject to any disclaimer, the term of this patent is extended or adjusted under 35 U.S.C. 154(b) by 68 days.

(21) Appl. No.: 16/282,618

(22) Filed: Feb. 22, 2019

(65) Prior Publication Data

US 2019/0271335 A1    Sep. 5, 2019

(30) Foreign Application Priority Data

Mar. 2, 2018 (JP) .............................. JP2018-037148

(51) Int. Cl.
| | |
|---|---|
| *F15B 13/04* | (2006.01) |
| *F16K 27/02* | (2006.01) |
| *F16K 31/04* | (2006.01) |
| *F16K 7/12* | (2006.01) |
| *F02M 63/00* | (2006.01) |
| *F16K 31/385* | (2006.01) |
| *F16K 31/365* | (2006.01) |

(52) U.S. Cl.
CPC ..... *F15B 13/0402* (2013.01); *F02M 63/0036* (2013.01); *F16K 7/12* (2013.01); *F16K 27/0236* (2013.01); *F16K 31/385* (2013.01); *F16K 31/365* (2013.01)

(58) Field of Classification Search
CPC .... F15B 13/0405; F16K 7/12; F16K 27/0236; F16K 1/32; F16K 1/34; F16K 31/0672; F16K 31/10

USPC ...................................................... 251/84, 86
See application file for complete search history.

(56) References Cited

U.S. PATENT DOCUMENTS

| | | | | |
|---|---|---|---|---|
| 4,742,845 | A * | 5/1988 | Capoccia ............... | F02M 69/54 137/510 |
| 4,986,298 | A * | 1/1991 | Martin ................. | A61M 1/0031 137/15.22 |
| 5,220,941 | A * | 6/1993 | Tuckey .................. | F02M 69/54 123/463 |
| 5,470,045 | A * | 11/1995 | Kazama ............... | F16K 31/0672 251/129.15 |
| 5,709,369 | A * | 1/1998 | Hawkins ................... | F16K 1/36 251/86 |
| 5,738,333 | A * | 4/1998 | Cognevich ............ | F16K 17/105 137/489.5 |

(Continued)

FOREIGN PATENT DOCUMENTS

JP        2013050158 A    3/2013

*Primary Examiner* — Seth W. Mackay-Smith
(74) *Attorney, Agent, or Firm* — Alleman Hall Creasman & Tuttle LLP (57) ABSTRACT

The fluid control valve comprises: a valve seat constituting a part of a valve chamber; a valve body that is installed in the valve chamber and moves in a contacting/separating direction with respect to the valve seat; an actuator configured to move the valve body; and a plunger that transfers power of the actuator to the valve body. The valve body and the plunger are in contact with each other via an inclination suppressing protrusion configured to suppress an inclination of the plunger, the inclination being caused by contact between the valve body and the valve seat.

6 Claims, 6 Drawing Sheets

(56) References Cited

U.S. PATENT DOCUMENTS

| | | | | |
|---|---|---|---|---|
| 6,173,736 B1* | 1/2001 | Ligh | ................... | F16K 17/085 |
| | | | | 137/494 |
| 6,422,265 B1* | 7/2002 | Beyer | ................... | F02M 69/54 |
| | | | | 123/463 |
| 6,520,479 B1* | 2/2003 | Sato | ................... | F16K 31/007 |
| | | | | 251/129.06 |
| 6,895,996 B2* | 5/2005 | Gutmann | ............... | F02M 69/54 |
| | | | | 123/457 |
| 8,430,378 B2* | 4/2013 | Hutchings | ........... | F16K 31/0672 |
| | | | | 137/859 |
| 9,841,771 B2* | 12/2017 | Yuzawa | ................... | F16K 7/12 |
| 9,938,875 B2* | 4/2018 | Myer | ................... | F04B 43/02 |
| 10,774,938 B2* | 9/2020 | Glime, III | ............. | F16K 25/005 |
| 2014/0352813 A1* | 12/2014 | Tharaldson | ........ | G05D 16/2095 |
| | | | | 137/505 |

\* cited by examiner

FLUID CONTROL VALVE AND FLUID CONTROL DEVICE

CROSS-REFERENCE TO RELATED APPLICATIONS

This application claims priority on Japanese Patent Application No. 2018-037148 filed on Mar. 2, 2018, the disclosure of which is incorporated by reference herein.

TECHNICAL FIELD

The present disclosure relates to a fluid control valve and a fluid control device.

BACKGROUND ART

As a fluid control valve conventionally used in a fluid control device (so-called mass flow controller), Patent Literature 1 discloses one including: a valve seat; a valve body adapted to move in a contacting/separating direction with respect to the valve seat; an actuator configured to move the valve body; a plunger that transfers the power of the actuator to the valve body; and a diaphragm that constitutes at least a part of a valve chamber accommodating the valve body and is connected to the circumferential surface of the plunger.

Meanwhile, in the above-described conventional fluid control device, a structure adapted to bring the valve body and the plunger into surface contact with each other is employed. Such a configuration is easily affected by tolerance caused by machining the valve body and the valve seat, and the inclination of the valve body caused by contact between the valve body and the valve seat inclines the plunger. Therefore, the manufacturing and assembling processes of each member require high accuracy. Also, if the state where the valve body and the plunger are in surface contact with each other is maintained, fluid accumulates in the gap between them, and the accumulating fluid may deteriorate the valve body and the plunger.

Further, in the above-described conventional fluid control valve, the diameter of the diaphragm is small, and its deflection amount is also small. As a result, the movable range of the plunger is also small, and therefore a controllable flow rate range is relatively small.

CITATION LIST

Patent Literature

Patent Literature 1: Japanese Unexamined Patent Application Publication No. 2013-50158

SUMMARY

Therefore, the present disclosure mainly intends to provide a fluid control valve having a structure that, when bringing a valve body and a valve seat into contact with each other, makes it hard to incline a plunger and also makes it hard for fluid to accumulate between the valve body and the valve seat. In addition, the present disclosure also intends to provide a fluid control valve having a structure that makes it possible to set a relatively wide controllable flow rate range.

Solution

That is, the fluid control valve according to an embodiment of the present invention is one including: a valve seat; a valve body that moves in a contacting/separating direction with respect to the valve seat; an actuator configured to move the valve body; and a plunger that transfers the power of the actuator to the valve body. In addition, the valve body and the plunger are in contact with each other via an inclination suppressing protrusion configured to suppress an inclination of the plunger caused by contact between the valve body and the valve seat.

In such a configuration, since the valve body and the plunger are in contact with each other via the inclination suppressing protrusion, the effect of the inclination of the valve body caused by contact between the valve body and the valve seat is hard to be transferred to the plunger. This makes it easy for the inclination of the plunger with respect to the valve seat to be kept constant. In addition, the inclination of the valve body caused by a member supporting the valve body is also hard to be transferred to the plunger. Further, fluid is hard to accumulate in the gap between the valve body and the plunger, and even when the state where the valve body and the plunger are in contact with each other is maintained, the valve body and the plunger are hard to be deteriorated.

Specifically, any one of the valve body and the plunger may be provided with the inclination suppressing protrusion, or both of the valve body and the plunger may be respectively provided with inclination suppressing protrusions. In this case, the inclination suppressing protrusion or the inclination suppressing protrusions may be of a curved surface shape. In addition, forming the inclination suppressing protrusion or the inclination suppressing protrusions in a curved surface shape makes it possible to suppress the contact point of the inclination suppressing protrusion or of the inclination suppressing protrusions from being crushed.

Also, the apex of the inclination suppressing protrusion may be positioned on an axis of the valve body and on an axis of the plunger. Note that the axes refer to axes passing through the centers of the valve body and plunger in their radial direction. In addition, it can also be said that when a part or whole of the valve body and plunger is of a rotationally symmetrical shape, the axes coincide with an axis serving as the center of the rotational symmetry.

The fluid control valve may be one further including a diaphragm that constitutes at least a part of a valve chamber accommodating the valve body and is connected to the circumferential surface of the plunger, in which the diaphragm includes a first plane facing the valve chamber side and a second plane facing the side opposite to the valve chamber, and the second plane is extended to the outer edge of the first plane or the outer side than the outer edge in the radial direction of the plunger.

In such a configuration, as compared with a conventional diaphragm, a diaphragm having a relatively large diameter can be provided to a casing having the same diameter, and the deflection amount of the diaphragm increases. This allows the movable range of the plunger connected to the diaphragm to be increased, and as a result, a flow rate range controllable by the fluid control valve can be set to be wide (large).

Further, the fluid control valve may be one further including an elastic body that supports the valve body, in which the elastic body is configured to press the valve body to the plunger side in a state where the valve body is pressed by the plunger.

In such a configuration, the parallelism of the valve body can be kept by the pressing force of the elastic body.

Further, an embodiment of the present invention includes a fluid control device including any of the above-described fluid control valves.

Advantageous Effects

According to the fluid control valve configured as described above, when bringing the valve body and the valve seat into contact with each other, the plunger is hard to incline, and also fluid is hard to accumulate between the valve body and the valve seat. In addition, a controllable flow rate range can be set to be relatively wide.

DESCRIPTION OF EMBODIMENTS

In the following, a fluid control valve according to one embodiment of the present invention and a fluid control device using the fluid control valve will be described on the basis of the drawings.

The fluid control device according to one embodiment of the present invention is a so-called mass flow controller used in a semiconductor manufacturing process. In addition the fluid control device according to the embodiment of the present invention can be used not only in the semiconductor manufacturing process but also in other processes.

First Embodiment

Figure 1:
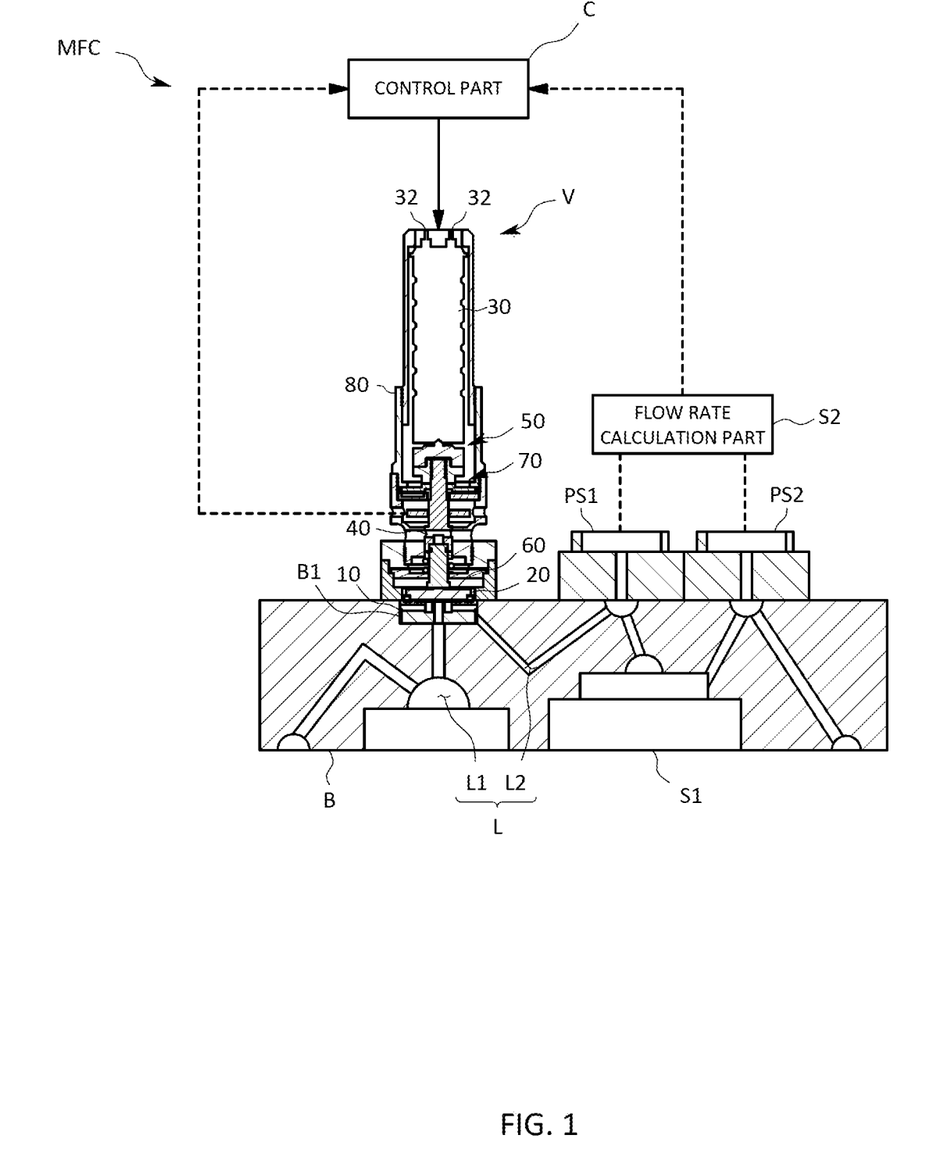
FIG. 1 is a schematic diagram illustrating the overall configuration of a fluid control device according to a first embodiment.

As illustrated in FIG. 1, a fluid control device MFC according to the present embodiment is a pressure type one. Specifically, the fluid control device MFC includes: a block body B inside which a flow path L is provided; a fluid control valve V installed on the block body B; paired pressure sensors PS1 and PS2 installed on the downstream side of the fluid control valve V on the block body B; and a control part C that feedback-controls the fluid control valve V so that the flow rate value of fluid through the flow path L calculated on the basis of pressure values measured by the paired pressure sensors PS1 and PS2 comes close to a predetermined target value.

The block body B is a rectangular-shaped one, whose predetermined surface is installed with the fluid control valve V and the paired pressure sensors PS1 and PS2. Also, the block body B is provided with a concave accommodation part B1 for installing the fluid control valve V on the predetermined surface of the block body B, and the accommodation part B1 divides the flow path L into an upstream side flow path L1 and a downstream side flow path L2. In addition, in the accommodation part B1, one end of the upstream side flow path L1 is opened in the bottom surface thereof, and one end of the downstream side flow path L2 is opened in the side surface thereof.

The paired pressure sensors PS1 and PS2 are respectively connected to the upstream and downstream sides of a laminar flow element S1 in the flow path L, and both connected to a flow rate calculation part S2 that calculates a flow rate on the basis of the outputs of the paired pressure sensors PS1 and PS2. The paired pressure sensors PS1 and PS2 are, together with the fluid control valve V, arranged in line and attached on the predetermined surface of the block body B.

The fluid control valve V is one of a so-called normally opened type. Specifically, the fluid control valve V includes: a valve seat 10 fitted into the accommodation part B1 of the block body B; a valve body 20 installed movably in a contacting/separating direction with respect to the valve seat 10; an actuator 30 configured to move the valve body 20; a plunger 40 interposed between the valve body 20 and the actuator 30 to transfer the power of the actuator 30 to the valve body 20; a connecting mechanism 50 interposed between the actuator 30 and the plunger 40 to connect the plunger 40 to the actuator 30; a filmy diaphragm 60 that constitutes a part of a valve chamber VR accommodating the valve body 20 and is integrally connected to the plunger 40; and a position sensor 70 installed on the plunger 40 to output an output value indicating the position of the valve body 20 with respect to the valve seat 10.

Also, the fluid control valve V includes a substantially tubular-shaped casing 80 that accommodates the actuator 30 and the plunger 40 in its internal space and is installed on the predetermined surface of the block body B. The casing 80 is divided into multiple parts in consideration of assembling, and the respective parts are connected by screwing, caulking, or the like. In addition, the casing 80 is provided on one side thereof with a concave part 81 formed by allowing the diaphragm 60 to separate the internal space. Further, the casing 80 is configured to allow the concave part 81 provided on one end side thereof to form the valve chamber VR by, with the valve seat 10 fitted into the accommodation part B1 of the block body B, bringing the one end of the casing 80 into close contact with the predetermined surface in such a manner as to block the accommodation part B1. Accordingly, a part of the inner surfaces of the valve chamber VR, specifically, the surface opposite to the valve seat 10 is formed of the diaphragm 60. In addition, the fluid control valve V is adapted to transfer the power of the actuator 30 to the valve body 20 via the plunger 40 using the deflection of the diaphragm 60 while maintaining the airtightness of the valve chamber VR.

Figure 2:
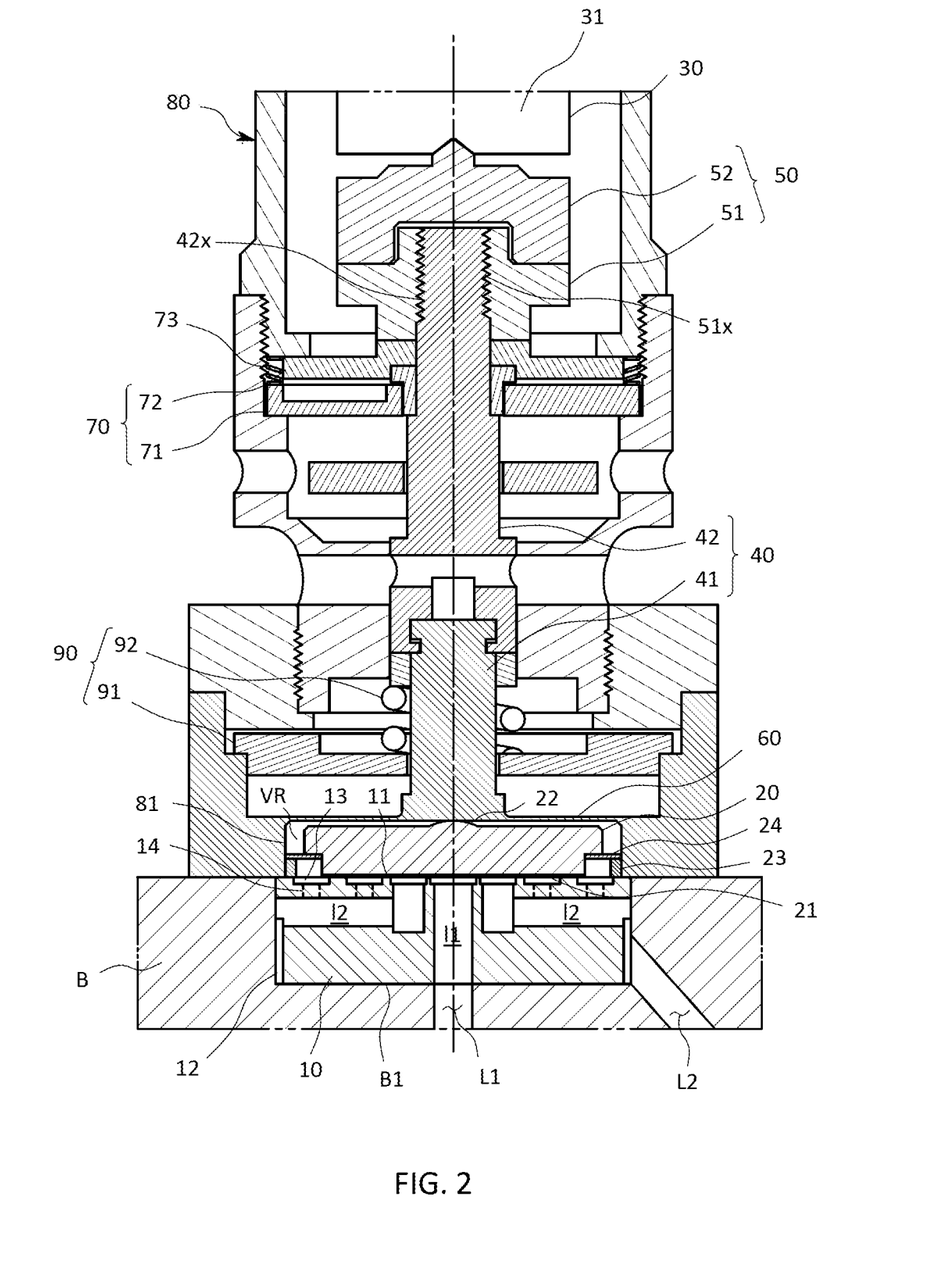
FIG. 2 is a partial schematic diagram illustrating the configuration of a fluid control valve according to the first embodiment.
Figure 3:
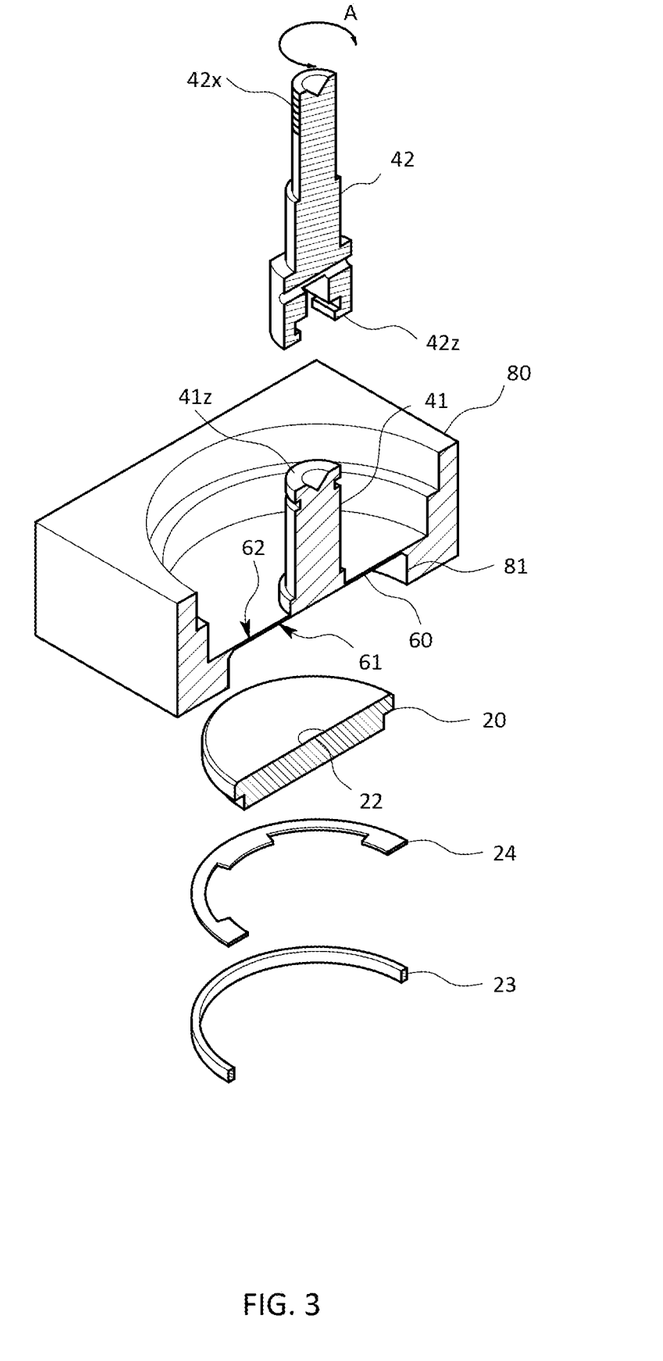
FIG. 3 is a cross-sectional perspective view illustrating a state where some parts constituting the fluid control valve according to the first embodiment are decomposed.
Figure 4:
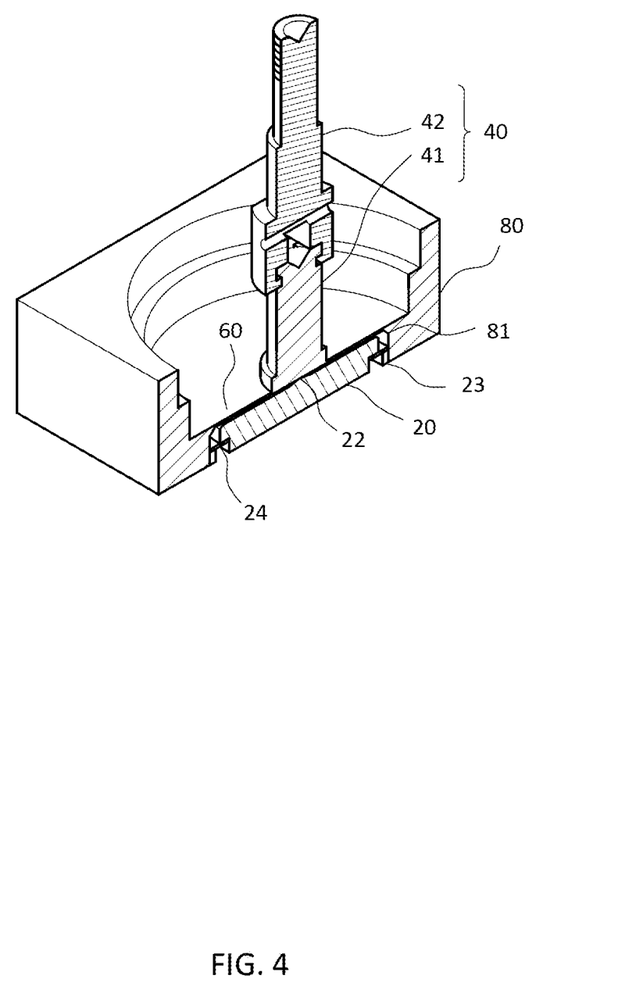
FIG. 4 is a cross-sectional perspective view illustrating a state where some parts constituting the fluid control valve according to the first embodiment are assembled.

Next, respective members constituting the fluid control valve V according to the present embodiment will be described in detail on the basis of FIGS. 2 to 5. Note that FIG. 3 and FIG. 4 illustrate parts constituting the fluid control valve V, in particular, only parts constituting the plunger 40, valve body 20, and their periphery.

The valve seat 10 is a block-shaped one fitted into the accommodation part B1 of the block body B. In addition, a surface of the valve seat 10 facing in the same direction as that of the predetermined surface of the block body B with the valve seat 10 fitted into the accommodation part B1 of the block body B is a valve seat surface 11, and the valve seat surface 11 includes a part of the inner surfaces of the valve chamber VR. Also, inside the valve seat 10, a first flow path 11 communicating with the upstream side flow path L1 and multiple second flow path 12 communicating with the downstream side flow path L2 are provided.

The first flow path 11 is such that one end thereof is opened in the center of the valve seat surface 11 and also the other end thereof is opened in a surface opposite to the bottom surface of the accommodation part B1. Also, the second flow paths 12 are such that one ends thereof are opened concentrically around the center of the valve seat surface 11 and also the other ends thereof are opened in an outer surface opposite to an inner surface of the accommodation part B1. Further, the outer surface of the valve seat 10 is stepwise, whose valve seat surface 11 side is adapted to be in close contact with the inner surface of the accommodation part B1 and whose surface side opposite to the valve seat surface 11 is adapted to be opposite to the inner surface of the accommodation part B1 with a clearance 12 kept. In doing so, in the state where the valve seat 10 is fitted into the accommodation part B1 of the block body B, the first flow path L1 communicates with the upstream side flow path 11, and also the second flow path L2 communicates with the downstream side flow paths 12 via the clearance 12.

The valve seat surface 11 is formed with multiple conduction grooves 13 concentrically around the center thereof. In addition, in each of the conduction grooves 13, multiple conduction holes 14 communicating with the second flow paths 12 are arranged at regular intervals. This allows the fluid accumulating in the valve chamber VR to be uniformly led out to the second flow paths 12.

The valve body 20 is a filmy one having a flat seating surface 21 opposite to the valve seat surface 11. In addition, the surface of the valve body 20 opposite to the diaphragm 60, which is the surface opposite to the seating surface 21, is provided with an inclination suppressing protrusion 22 having a curved surface shape (specifically, a spherical surface shape). Further, the inclination suppressing protrusion 22 is provided opposite to the plunger 40 connected to the diaphragm 60. Also, the inclination suppressing protrusion 22 is provided in such a manner as to position the apex thereof on the axis of the valve body 20 (indicated by an alternate long and short dash line in FIG. 2), and also arranged such that the apex is positioned on the axis of the plunger 40 (indicated by an alternate long and short dash line in FIG. 2). Also, the valve body 20 is supported by the valve seat surface 11 via an annular leaf spring 24 placed on a support ring 23 installed on the valve seat surface 11. This allows the valve body 20 to be repelled by the leaf spring 24 against pressing force on the valve seat 10 side.

The actuator 30 includes: a piezo stack 31 made by stacking multiple piezo elements; and terminals 32 (see FIG. 1) for applying voltage (or current) to the piezo stack 31. In addition, the actuator 30 is held on the other side of the casing 80, and configured so that the piezo stack 31 is extended toward the one end side of the casing 80 by the voltage applied via the terminals 32.

The plunger 40 is a rodlike one whose one end is formed integrally with the diaphragm 60 and whose other side is a rodlike member extending toward the actuator 30 side. In addition, the plunger 40 is divided between the diaphragm 60 and the actuator 30, and includes: a first division body 41 connected to the diaphragm 60; and a second division body 42 arranged on the actuator 30 side of the first division body 41.

The circumferential surface of the first division body 41 on the valve body 20 side is integrally formed with the diaphragm 60. In addition, the first division body 41 is configured so that the fore end surface thereof on the valve body side 20 comes into contact with the inclination suppressing protrusion 22 of the valve body 20. Specifically, the first division body 41 (plunger 40) is in point contact with the apex of the inclination suppressing protrusion 22 at a point positioned on the axis thereof. Note that the point contact includes, in addition to a state where the valve body 20 and the plunger 40 contact with each other strictly at a point, a state where the contact point between the valve body 20 and the plunger 40 is deformed by aged deterioration and both are not in strict point contact with each other, and also a state where the valve body 20 and the plunger 40 are not strict point contact with each other because of errors and the like caused during manufacturing of them. Further, the first division body 41 is provided on the actuator 30 side thereof with a connecting convex part 41z connected to the second division body 42.

The circumferential surface of the second division body 42 on the actuator 30 side is formed with a screw groove 42x. In addition, the second division body 42 is connected to the actuator 30 via the connecting mechanism 50 on the actuator 30 side thereof. Specifically, the connecting mechanism 50 includes: a substantially nut-shaped screw member 51 provided with a screw hole 51x into which the screw groove 42x of the second division body 42 is fitted; and a contact member 52 mutually fitted to the screw member 51 to contact with the actuator 30, and the second division body 42 is connected to the actuator 30 via these members 51 and 52. Also, the second division body 42 is provided with a connecting concave part 42z connected to the first division body 41 on the valve body 20 side thereof.

In addition, the screw member 51 and the contact member 52 are connected so that they can mutually slide in a direction intersecting with (direction orthogonal to) the axial direction of the plunger 40. In doing so, axial displacement in the direction orthogonal to the axial direction caused by manufacturing and assembling errors of the respective members can be accommodated.

Also, the second division body 42 is structured to be pressed toward the actuator 30 side by a pressing mechanism 90. Specifically, the pressing mechanism 90 includes: a support member 91 held preventing positional displacement inside the casing 80; and an elastic body 92 (e.g., a coil spring) through which the first division body 41 is passed and whose one end is supported by the support member 91. In addition, the second division body 42 is adapted to be pressed toward the actuator 30 side by the elastic body 92 when the plunger 40 is pressed by the actuator 30 to move to the valve body 20 side and thereby the diaphragm 60 is deflected toward the valve chamber VR side.

Figure 5:
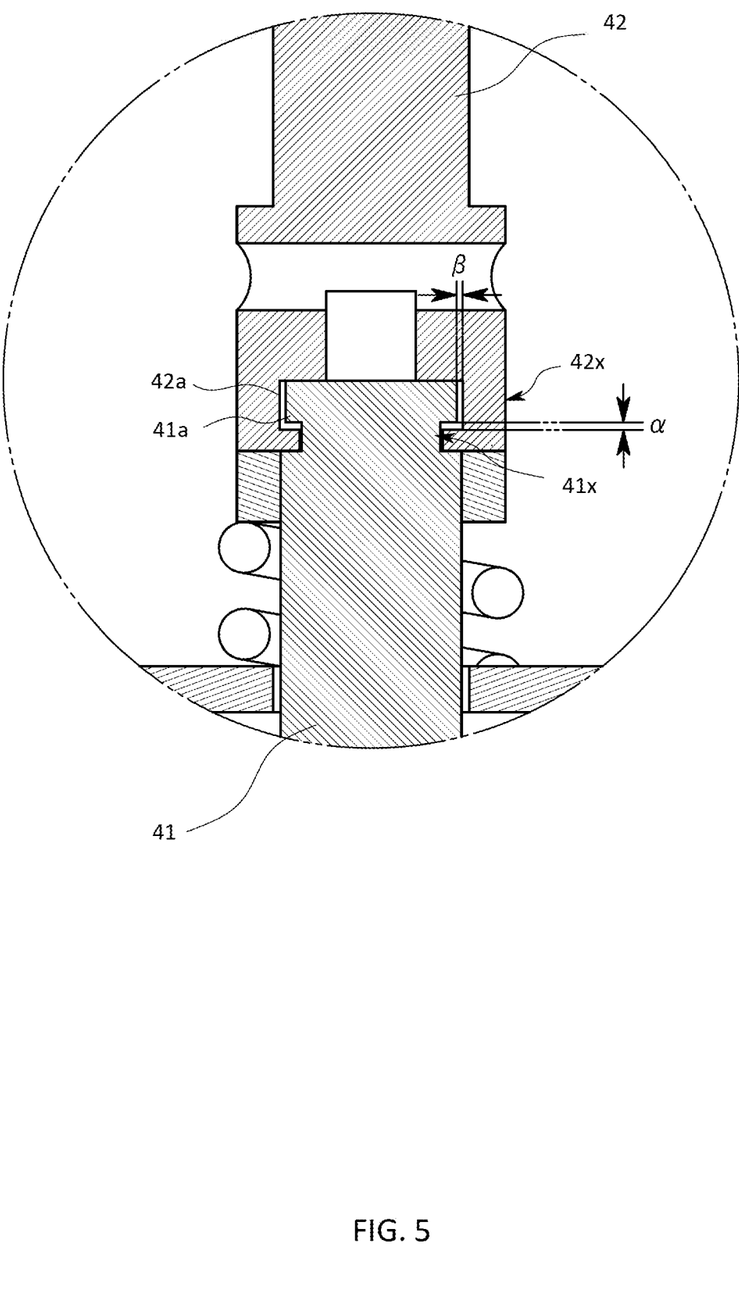
FIG. 5 is an enlarged schematic diagram illustrating a part of a plunger constituting the fluid control valve according to the first embodiment.

Next, the connecting structure between the first division body 41 and the second division body 42 will be described in detail on the basis of FIG. 5.

The first division body 41 and the second division body 42 are configured to connect to each other via the connecting convex part 41z and connecting concave part 42z. The connecting convex part 41z is formed in a cross-sectionally T shape. The connecting convex part 41z is provided on the outer circumferential surface thereof with a fitting piece 41a. In addition, the fitting piece 41a is formed in a shape rotationally symmetric around an axis extending in the axial direction of the plunger 40, and this allows the shape to circle in the circumferential direction of the plunger 40. Also, the connecting concave part 42z is formed in a cross-sectionally T shape, and penetrates from one side surface to a surface opposite to the one side surface. The connecting concave part 42z is provided in the inner circumferential surface thereof with a fitting groove 42a into which the fitting piece 41a is fitted.

In addition, the width of the fitting groove 42a in the axial direction of the plunger 40 is longer than the width of the fitting piece 41a in the axial direction by a predetermined distance a. Further, the diameter of the fitting groove 42a in the direction orthogonal to the axial direction of the plunger 40 is longer than the diameter of the fitting piece 41a in the orthogonal direction by a predetermined distance β.

The first division body 41 and the second division body 42 are configured to be connectable by sliding the connecting convex part 41z to fit it into the connecting concave part 42z, and at this time, the fitting piece 41a is in a state of being fitted into the fitting groove 42a. In addition, the second division body 42 is configured to slide the fitting groove 42a along the fitting piece 41a by fitting the fitting piece 41a and the fitting groove 42a to each other, and freely rotate in the circumferential direction of the second division body 42 (in the arrow A direction in FIG. 3). In other words, the second division body 42 is adapted to be rotatable in a tightening direction and a loosening direction of the screw member 51 with respect to the first division body 41. Also, the second division body 42 is configured to slide the fitting groove 42a in the axial direction of the plunger 40 along the fitting piece 41a and slide by the predetermined distance a by fitting the fitting piece 41a and the fitting groove 42a to each other. Further, the second division body 42 is configured to slide the fitting groove 42a in the direction orthogonal to the axial direction of the plunger 40 along the fitting piece 41a and be slidable by the predetermined distance β by fitting the fitting piece 41a and the fitting groove 42a to each other.

The diaphragm 60 is one that is formed in such a manner as to separate the internal space of the casing 80 and plays a role in transmitting the movement of the plunger 40 to the valve body 20 while maintaining the airtightness of the valve chamber VR. In addition, the diaphragm 60 has a first plane 61 facing the valve chamber VR side and a second plane 62 facing the side opposite to the valve chamber VR (the side toward the internal space of the casing 80). Further, the second plane 62 is extended to the outer side than the outer edge of the first plane in the radial direction of the plunger 40 connected to the diaphragm 60. This makes it possible to set the diameter of the diaphragm 60 to be large, and thereby the diaphragm 60 can be largely deflected. As a result, the degree of freedom of movement of the plunger 40 in the axial direction increases, and along with this, the moving distance of the valve body 20 also increases. This makes it possible to widen a flow rate range controllable by the fluid control valve V.

The position sensor 70 is one that outputs the output value indicating the position of the seating surface 21 of the valve body 20 with respect to the valve seat surface 11 of the valve seat 10. In addition, the position sensor 70 includes: a first sensor part 71 fixed to the casing 80 so that a relative position to the valve seat surface 11 of the valve seat 10 does not change; and a second sensor part 72 fixed to the second division body 42, and is configured to output, as the output value, a value based on the relative position (relative distance) between the first sensor part 71 and the second sensor part 72 serving as a target for it. In addition, the first sensor part 71 is constantly pressed toward the valve seat 10 side by a leaf spring 73 supported by the casing 80, and in doing so, positional displacement is suppressed. Also, the second sensor part 72 is fixed to the second division body 42 via the screw member 51 so as to prevent positional displacement. In doing so, the positions of the respective members constituting the position sensor 70 are fixed, and thereby the detection accuracy of the position sensor 70 is improved.

The control part C has a so-called computer including a CPU, a memory, A/D and D/A converters, and the like, and is adapted to implement the above-described respective functions by executing a program stored in the memory to make various types of equipment cooperate. Specifically, the control part C is one that feedback-controls the fluid control valve V using the output value of the position sensor 70 so that the flow rate value calculated by the flow rate calculation part S3 comes close to the target value preliminarily stored in the memory.

Next, the operation of the fluid control valve V according to the present embodiment will be described.

In the fluid control valve V, when the voltage is not applied to the actuator 30, a valve opening level (the distance between the valve seat surface 11 of the valve seat 10 and the seating surface 21 of the valve body 20) is set to have a predetermined value. Note that when the valve opening level has the predetermined value, the fluid control valve V is in a fully opened state.

Then, when the voltage is applied to the actuator 30, the actuator 30 is extended. As a result, power associated with the extension of the actuator 30 is transferred to the valve body 20 in the order of the connecting mechanism 50, the second division body 42 (plunger), and the first division body 41 (plunger), and the valve body 20 is moved in a direction to contact with (in a direction to come close to) the valve seat 10 while resisting the pressing force of the leaf spring 24. This allows the valve opening level to have a smaller value than the predetermined value. In addition, the extension of the actuator 30 increases as an applied voltage value (or current value) is increased, and therefore by adjusting the magnitude of the voltage value, the valve opening level can be controlled.

In addition, when the voltage applied to the actuator 30 has a predetermined value or more, the valve seat surface 11 of the valve seat 10 and the seating surface 21 of the valve body 20 contact with each other. At this time, the valve body 20 may incline due to the tolerance of the valve seat 10 and that of the valve body 20. However, since the valve body 20 and the plunger 40 are in contact with each other via the inclination suppressing protrusion 22, the inclination of the plunger 40 due to the inclination of the valve body 20 is suppressed.

Subsequently, when the voltage applied to the actuator 30 decreases, the actuator 30 is contracted. As a result, in association with the contraction of the actuator 30, the valve body 20 is moved in a direction to separate from (in a direction to get away from) the valve seat 10 by the pressing force of the leaf spring 24. This allows the valve opening level to have a large value.

In addition, when the voltage applied to the actuator 30 decreases, power associated with the contraction of the actuator 30 is adapted not to be directly transferred to the diaphragm 60. In detail, when the actuator 30 contracts, the second division body 42 is moved to the actuator 30 side by the pressing force of the elastic body 92. However, since the second division body 42 is configured to be slidable by the predetermined distance a with respect to the first division body 41, the movement of the second division body 42 is accommodated by the sliding operation and is thereby not directly transmitted to the first division body 41. In addition, the first division body 41 is moved to the actuator 30 side by the restoring force of the diaphragm 60, and also the valve body 20 is moved by the pressing force of the leaf spring 24 in a direction to separate from the valve seat 10, thus allowing the valve opening level to have a large value. This makes it hard for the force associated with the contraction of the actuator 30 to be directly transferred to the diaphragm 60, and therefore the diaphragm 60 can be suppressed from being damaged. Also, as compared with the case where the plunger 40 is integrally formed, power (the pressing force of the pressing mechanism 90 and the restoring force of the diaphragm 60) for moving the plunger 40 to the actuator 30 side increases. This allows the follow-up operation of the plunger 40 associated with the contraction movement of the actuator 30 to be sped up, thus improving the responsiveness of the fluid control valve V.

OTHER EMBODIMENTS

Figure 6:
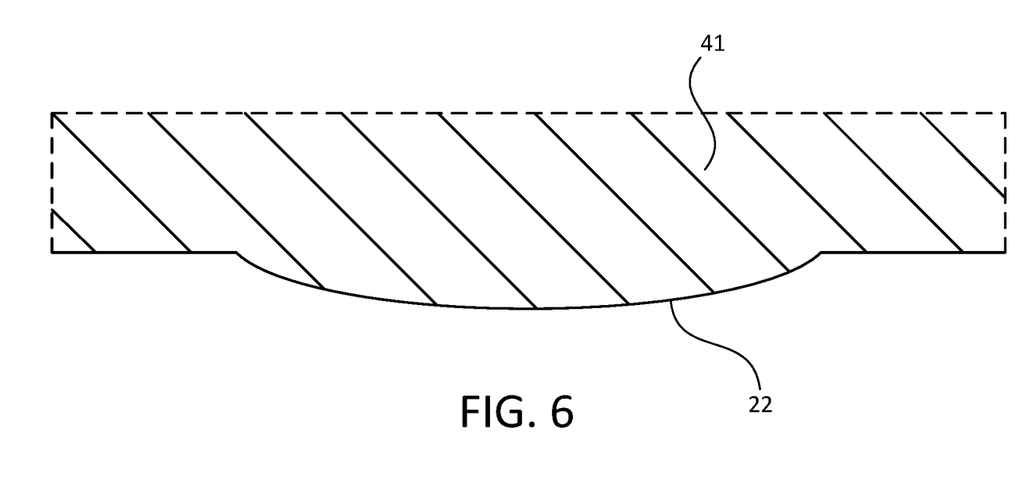
FIG. 6 is an enlarged schematic diagram illustrating a part of the plunger constituting the fluid control valve according to another embodiment.

In the above-described first embodiment, as the inclination suppressing protrusion 22 of the valve body 20, one having a curved surface shape is employed, but one having, for example, a conical shape, a pyramidal shape, or the like is also possible. However, forming the inclination suppressing protrusion 22 in a curved surface shape makes it harder for the inclination suppressing protrusion 22 to be crushed by contact with the plunger 40. Also, in the above-described first embodiment, the inclination suppressing protrusion 22 is provided on the valve body 20 side, but may be provided on the plunger 40 side. Alternatively, inclination suppressing protrusions 22 may be respectively provided on both of the valve body 20 side and the plunger 40 side.

Further, in the above-described first embodiment, the second plane 62 of the diaphragm 60 is extended to the outer side than the outer edge of the first plane 61 in the radial direction of the plunger 40, but may be extended to the outer edge of the first plane 61. In addition, in other words, it can also be said that the circumferential edge of the second plane 62 is extended to the circumferential edge of the first plane 61 or to the outer side than the circumferential edge.

Still further, in the above-described first embodiment, the description is given while exemplifying the fluid control valve V of a normally opened type. However, in another embodiment, a fluid control valve of a normally closed type is also applicable.

Also, in the above-described first embodiment, as the actuator 30 of the fluid control valve V, the piezo element (piezo stack) is used, but a solenoid or the like may be used.

Also, in the above-described first embodiment, the description is given while exemplifying, as the fluid control device MFC, a mass flow controller of a type adapted to feedback-control the fluid control valve V on the basis of the output value of the position sensor 70. However, without limitation to this, in another embodiment, a mass flow controller of a type adapted to feedback-control a fluid control valve on the basis of the measured value of a thermal type flow rate sensor or a pressure type flow rate sensor is also applicable.

Besides, it goes without saying that the present invention is not limited to each of the above-described embodiments but can be variously modified without departing from the scope thereof.

LIST OF REFERENCE CHARACTERS

MFC: Fluid control device
B: Block body
S: Flow rate sensor
V: Fluid control valve
10: Valve seat
20: Valve body
21: Seating surface
22: Inclination suppressing protrusion
30: Actuator
40: Plunger
60: Diaphragm
61: First plane
62: Second plane
70: Position sensor
80: Casing
90: Pressing mechanism

The invention claimed is:

1. A fluid control valve comprising:
a valve seat constituting a part of a valve chamber;
a valve body that is installed in the valve chamber and moves in a contacting/separating direction with respect to the valve seat;
an actuator configured to move the valve body; and
a plunger that transfers power of the actuator to the valve body, wherein
the valve body and the plunger are in contact with each other via an inclination suppressing protrusion configured to suppress an inclination of the plunger, the inclination being caused by contact between the valve body and the valve seat;
the plunger is movable independently of the valve body;
any one of the valve body and the plunger is provided with the inclination suppressing protrusion, and the other of the valve body and the plunger is provided with a planar surface that contacts the inclination suppressing protrusion;
the inclination suppressing protrusion and the planar surface are in point contact with each other on an axis of the plunger; and
a portion of a casing that is connected to the plunger via a diaphragm contacts a region on a valve seat surface of the valve seat that is radially or laterally outside of a contact surface of the valve seat with the valve body.

2. The fluid control valve according to claim 1, wherein the inclination suppressing protrusion is of a curved surface shape.

3. The fluid control valve according to claim 2, wherein an apex of the inclination suppressing protrusion is positioned on an axis of the valve body and on the axis of the plunger.

4. The fluid control valve according to claim 2, wherein the diaphragm constitutes at least a part of the valve chamber accommodating the valve body and is connected to a circumferential surface of the plunger,
the diaphragm includes a first plane facing a valve chamber side and a second plane facing a side opposite to the valve chamber, and
the second plane is extended to an outer edge of the first plane or beyond the outer edge of the first plane in a radial direction of the plunger.

5. The fluid control valve according to claim 1, further comprising
an annular leaf spring that supports the valve body, wherein
the annular leaf spring is configured to press the valve body to a plunger side in a state where the valve body is pressed by the plunger.

6. A fluid control device comprising:
a controller including a processor and a memory; and
a fluid control valve operatively coupled to the controller, the fluid control valve comprising:
a valve seat constituting a part of a valve chamber;

a valve body that is installed in the valve chamber and moves in a contacting/separating direction with respect to the valve seat;

an actuator configured to move the valve body; and a plunger that transfers power of the actuator to the valve body, wherein the valve body and the plunger are in contact with each other via an inclination suppressing protrusion configured to suppress an inclination of the plunger, the inclination being caused by contact between the valve body and the valve seat;

the plunger is movable independently of the valve body;

any one of the valve body and the plunger is provided with the inclination suppressing protrusion, and the other of the valve body and the plunger is provided with a planar surface that contacts the inclination suppressing protrusion;

the inclination suppressing protrusion and the planar surface are in point contact with each other on an axis of the plunger; and a portion of a casing that is connected to the plunger via a diaphragm contacts a region on a valve seat surface of the valve seat that is radially or laterally outside of a contact surface of the valve seat with the valve body.

* * * * *

UNITED STATES PATENT AND TRADEMARK OFFICE
CERTIFICATE OF CORRECTION

| | | |
|---|---|---|
| PATENT NO. | : 11,193,509 B2 | Page 1 of 1 |
| APPLICATION NO. | : 16/282618 | |
| DATED | : December 7, 2021 | |
| INVENTOR(S) | : Tadahiro Yasuda and John Dick | |

It is certified that error appears in the above-identified patent and that said Letters Patent is hereby corrected as shown below:

In the Claims

Column 10,

Line 42, In Claim 3, delete "2" and add --1--;

Line 46, In Claim 4, delete "2" and add --1--.

Signed and Sealed this
Twenty-ninth Day of March, 2022

Drew Hirshfeld
*Performing the Functions and Duties of the*
*Under Secretary of Commerce for Intellectual Property and*
*Director of the United States Patent and Trademark Office*